United States Patent
Grichnik et al.

(10) Patent No.: US 7,792,662 B2
(45) Date of Patent: Sep. 7, 2010

(54) AUTOMATIC HOSE AND HARNESS ROUTING METHOD AND SYSTEM

(75) Inventors: Anthony J. Grichnik, Peoria, IL (US); Tatiana Kalganova, Uxbridge (GB)

(73) Assignee: Caterpillar Inc, Peoria, IL (US)

( * ) Notice: Subject to any disclaimer, the term of this patent is extended or adjusted under 35 U.S.C. 154(b) by 605 days.

(21) Appl. No.: 11/790,183

(22) Filed: Apr. 24, 2007

(65) Prior Publication Data

US 2008/0015824 A1 Jan. 17, 2008

Related U.S. Application Data

(60) Provisional application No. 60/795,588, filed on Apr. 28, 2006.

(51) Int. Cl.
*G06F 17/10* (2006.01)
(52) U.S. Cl. .............................. 703/2; 703/1
(58) Field of Classification Search ............... 703/1, 703/2
See application file for complete search history.

(56) References Cited

U.S. PATENT DOCUMENTS 5,578,792 A * 11/1996 Devonald et al. ............. 174/50
6,981,316 B2 * 1/2006 Korczynski .................. 29/830

OTHER PUBLICATIONS

Sunand Sandurkar, Wei Chen, "GAPRUS—Genetic Algorithms Based Pipe Routing Using Tessellated Objects", Computers in Industry 38 (1999), pp. 209-223.
Conru, Andrew B. "A genetic approach to the cable harness routing problem" Evolutionary Computation, 1994, IEEE, Jun. 27, 1994, pp. 200-205. XP010122848 ISBN: 0-7803-1899-4.
"Ant colony optimization" [Online] Apr. 22, 2006, XP002444862. Retrieved from the Internet: URL:http://en.wikipedia.org/w/index.php?title=Ant_colony_optimization&oldid=49603872 &printable=yes, retrieved Jul. 30, 2007.
Kuan et al: "Solving the feeder bus network design problem by genetic algorithms and ant colony optimization" Advances in Engineering Software, Elsevier Science, Oxford, GB, vol. 37, No. 6, Jun. 2006, pp. 351-359, XP005512059 ISSN: 0965-9978.

* cited by examiner

*Primary Examiner*—Russell Frejd
(74) *Attorney, Agent, or Firm*—Finnegan, Henderson, Farabow, Garrett & Dunner LLC

(57) ABSTRACT

A method is provided for automatic hose and harness routing. The method may include obtaining a solid model of a structural design of a structure assembly and deriving a mathematical representation of the solid model. The method may also include selecting at least a pair of connection points, including a start point and an end point and determining a desired path between the start point and the end point. Further, the method may include performing a validity check on the desired path to decide whether the desired path is valid and presenting the desired path.

22 Claims, 5 Drawing Sheets

AUTOMATIC HOSE AND HARNESS ROUTING METHOD AND SYSTEM

CROSS REFERENCE TO RELATED APPLICATIONS

This application is based upon and claims the benefit of priority from U.S. Provisional Application No. 60/795,588 to Anthony Grichnik et al. filed on Apr. 28, 2006.

TECHNICAL FIELD

This disclosure relates generally to computer based design techniques and, more particularly, to methods and systems for automatic hose and harness routing.

BACKGROUND

Design of modern industrial products, such as vehicles, machines, equipment, architectures, consumer products, etc., often involve complex structural assemblies. Modern structural assemblies may be designed to be compact and cost efficient. In addition, the structural assemblies associated with hoses and/or harnesses often include wirings, cables, pipes, and other specific lines for purposes such as control, communication, fluid power or hydraulics, etc. Because a particular structure may only support a certain types of configuration of the hoses or harnesses, it may be desired to consider the routing of the hoses or harnesses during the design process of the structural assemblies such that the hoses may be aligned properly.

However, even when the hose and harness routing is pre-considered, the designed structural assemblies may frequently undergo design changes for many reasons. Each time the structures are changed, the hose and harness routing often needs to be performed manually to adjust the changes in structure. Such manual performance may be time and/or cost consuming.

Techniques for computer based routing calculation of the hoses and harnesses have been developed to reduce the amount of manual performance. For example, Sunand Sandurkar, Wei Chen, *GAPRUS —genetic algorithms based pipe routing using tessellated objects*, Computer in Industry 38, pp. 209-223 (1999), discloses a genetic algorithm based routing algorithm to globally search a routing path between two end points with minimum length and minimum number of bend. However, such a genetic algorithm often fails to consider various practical factors, such as priority between paths, real size of the path, etc., and/or to consider multiple routing paths of different connections simultaneously.

Methods and systems consistent with certain features of the disclosed systems are directed to solving one or more of the problems set forth above.

SUMMARY OF THE INVENTION

One aspect of the present disclosure includes a method for automatic hose and harness routing. The method may include obtaining a solid model of a structural design of a structure assembly and deriving a mathematical representation of the solid model. The method may also include selecting at least a pair of connection points including a start point and an end point and determining a desired path between the start point and the end point. Further, the method may include performing a validity check on the desired path to decide whether the desired path is valid and presenting the desired path.

Another aspect of the present disclosure includes a method for automatic hose and harness routing. The method may include selecting a plurality of pairs of connection points and starting a genetic algorithm with a priority among the plurality of pairs of connection points. The method may also include determining a respective plurality of desired paths for the plurality of pairs of connection points in sequence according to the priority and calculating a total cost of the plurality of desired paths. Further, the method may include determining whether the total cost is below a predetermined threshold and completing the genetic algorithm if the total cost is below the predetermined threshold.

Another aspect of the present disclosure includes a computer system. The computer system may include a processor and a database. The processor may be configured to obtain a solid model of a structural design of a structure assembly and to derive a mathematical representation of the solid model. The processor may also be configured to select at least a pair of connection points including a start point and an end point and determine a desired path between the start point and the end point. Further, the processor may be configured to perform a validity check on the desired path to decide whether the desired path is valid, and the database may be configured to store the desired path by the processor.

Another aspect of the present disclosure includes a computer-readable medium for use on a computer system configured to perform automatic hose and harness routing, the computer-readable medium having computer-executable instructions for performing a method. The method may include obtaining a solid model of a structural design of a structure assembly and deriving a mathematical representation of the solid model. The method may also include selecting at least a pair of connection points including a start point and an end point and determining a desired path between the start point and the end point. Further, the method may include performing a validity check on the desired path to decide whether the desired path is valid and presenting the desired path.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
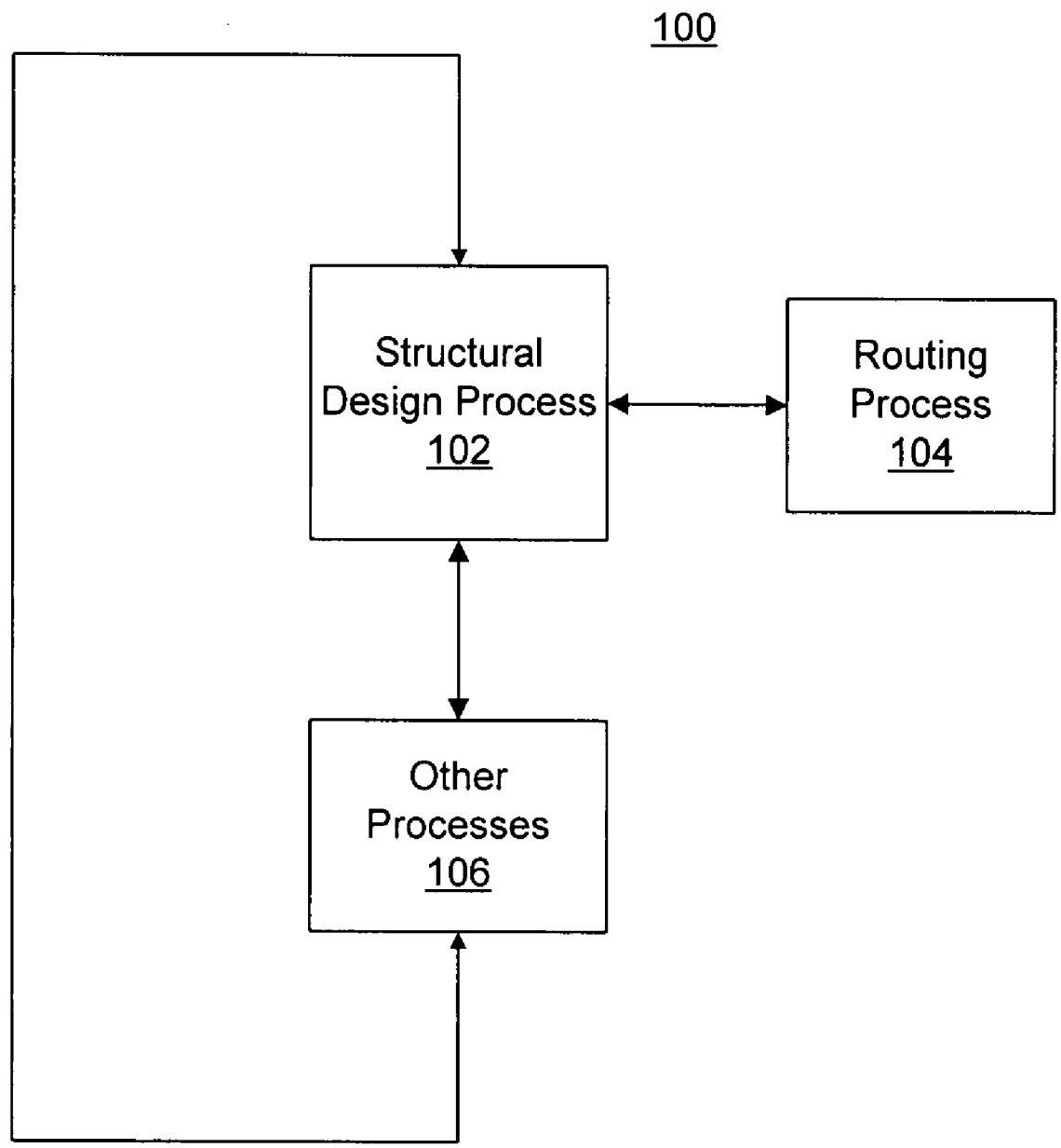
FIG. 1 is a pictorial illustration of an exemplary hose and harness routing process environment consistent with certain disclosed embodiments.

FIG. 1 illustrates a block diagram of an exemplary automatic hose and harness routing environment 100. As shown in FIG. 1, a structural design process 102 is coupled with a routing process 104. Structural design process 102 may also be coupled with other processes 106.

Structural design process 102 may be provided to perform computer based design processes related to a particular structural assembly. A structural assembly may refer to any product or component of a product that includes one or more physical structures. For example, a structural assembly may include a vehicle, such as cars, trucks, construction vehicles, aircraft, etc., machines, factories, equipment, and/or consumer products, such as appliances, electronics, etc. Further, a structural assembly may also include a component of a product, such as a circuit board of an electronic product, or a load bearing assembly of a construction vehicle, etc.

A structural assembly may also include hoses and harnesses to be routed through the structural assembly or attached to certain surfaces of the structural assembly. As used in this specification, hoses and harnesses may refer to any appropriate type of physical lines of certain materials. For example, the hoses and harnesses may include wirings, cables, pipes, electrical harnesses, hydraulic lines, metal connections in printed circuit boards (PCB), etc.

Structural design process 102 may perform various structural design processes to generate a structural design of a particular structure assembly. The structural design may be represented in any appropriate computer recognizable data form, such as forms used by a CAD software program. The structural design may also be provided to other processes 106 to improve the structural design or to use the structural design for other purposes, such as integrating the structural design into a complete product or into other products, etc. Other processes 106 may include one or more processes for performing any appropriate type of design functionality together with structural design process 102.

Other processes 106 may modify the structural design created by structural design process 102 and may provide the modifications back to structural design process 102. Other processes 106 may also send required modifications to structural design process 102 without making actual modification. And structural design process 102, after receiving modification requirements from other processes 106, may change the structural design accordingly. Therefore, a new version of the structural design may be generated. Such interactions between structural design process 102 and other process 106 may continue until the structural design is finalized.

When structural design process 102 generates a structural design, structural design process 102 may provide the structural design to routing process 104 for automatically performing hose and harness routing for the structural design. Routing process 104 may perform hose and harness routing based on the structural design and other appropriate type of information, such as geometric constraints of the structural design, physical size requirement for the hoses or harnesses, and/or schematic information containing information on starting points, ending points, and/or passing points of various hoses and harnesses as well as performance requirements associated with the schematic, such as current drop, voltage drop, pressure losses, and/or flow rates, etc.

Figure 2:
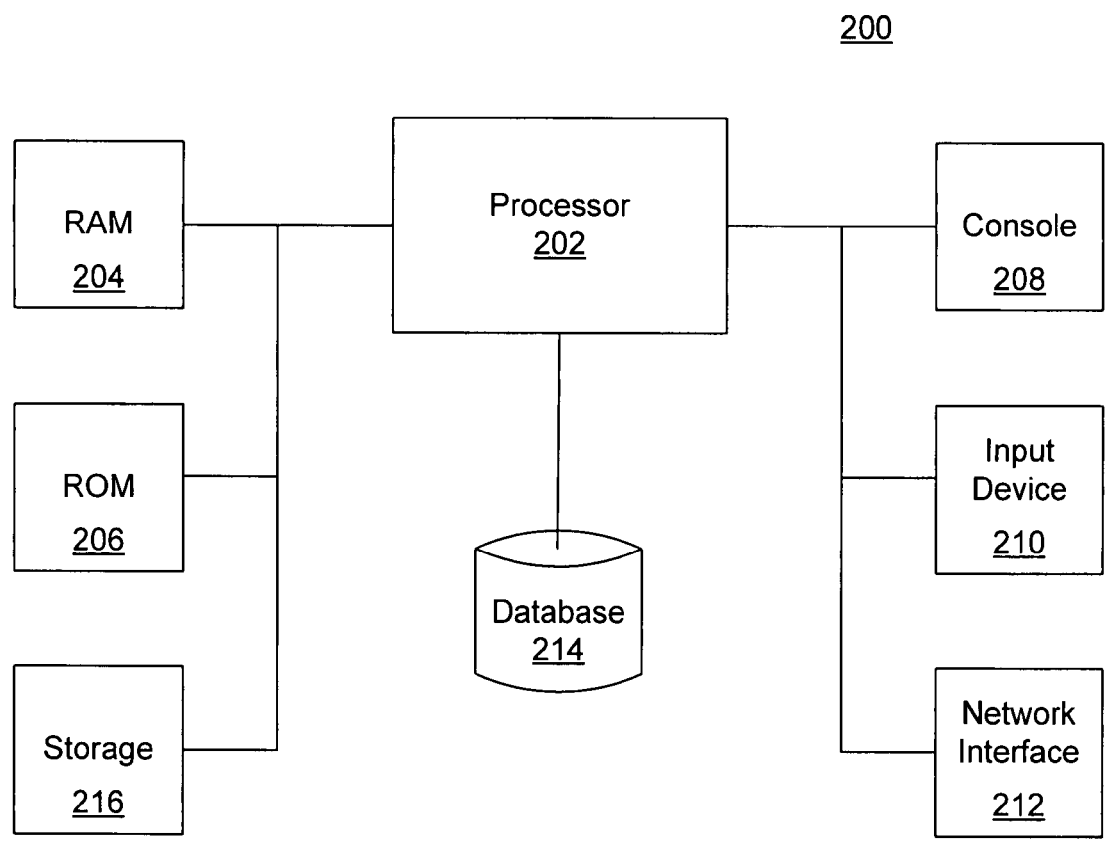
FIG. 2 illustrates a block diagram of a computer system consistent with certain disclosed embodiments.

Routing process 104, structural design process 102, and/or other processes 106 may be carried out by one or more computer systems. FIG. 2 shows a functional block diagram of an exemplary computer system 200 that may be used to perform these processes.

As shown in FIG. 2, computer system 200 may include a processor 202, a random access memory (RAM) 204, a read-only memory (ROM) 206, a console 208, an input device 210, a network interface 212, a databases 214, and a storage 216. It is understood that the type and number of listed devices are exemplary only and not intended to be limiting. The number of listed devices may be changed and other devices may be added.

Processor 202 may include any appropriate type of general purpose microprocessor, digital signal processor, or microcontroller. Processor 202 may execute sequences of computer program instructions to perform various processes as explained above. The computer program instructions may be loaded into RAM 204 for execution by processor 202 from a read-only memory (ROM), or from storage 216. Storage 216 may include any appropriate type of mass storage provided to store any type of information that processor 202 may need to perform the processes, such as the computer program instructions and/or various data. For example, storage 216 may include one or more hard disk device, floppy disk, optical disk device, or other storage device to provide storage space.

Console 208 may provide a graphic user interface (GUI) to display or present information to users of computer system 200. Console 208 may include any appropriate type of computer display device or computer monitor. Input device 210 may be provided for users to input information into computer system 200. Input device 210 may include a keyboard, a mouse, or other optical or wireless computer input devices, etc. Further, network interface 212 may provide communication connections such that computer system 200 may be accessed remotely through computer networks via various communication protocols, such as transmission control protocol/internet protocol (TCP/IP), hyper text transfer protocol (HTTP), etc.

Database 214 may contain model data and/or any information related to the processes, such as configuration data, algorithm data, structural parameters, and/or any other design data, etc. Database 214 may include any type of commercial or customized database. Database 214 may also include analysis tools for analyzing the information in the database. Processor 202 may use database 214 to determine and store performance characteristics of the processes.

Figure 3:
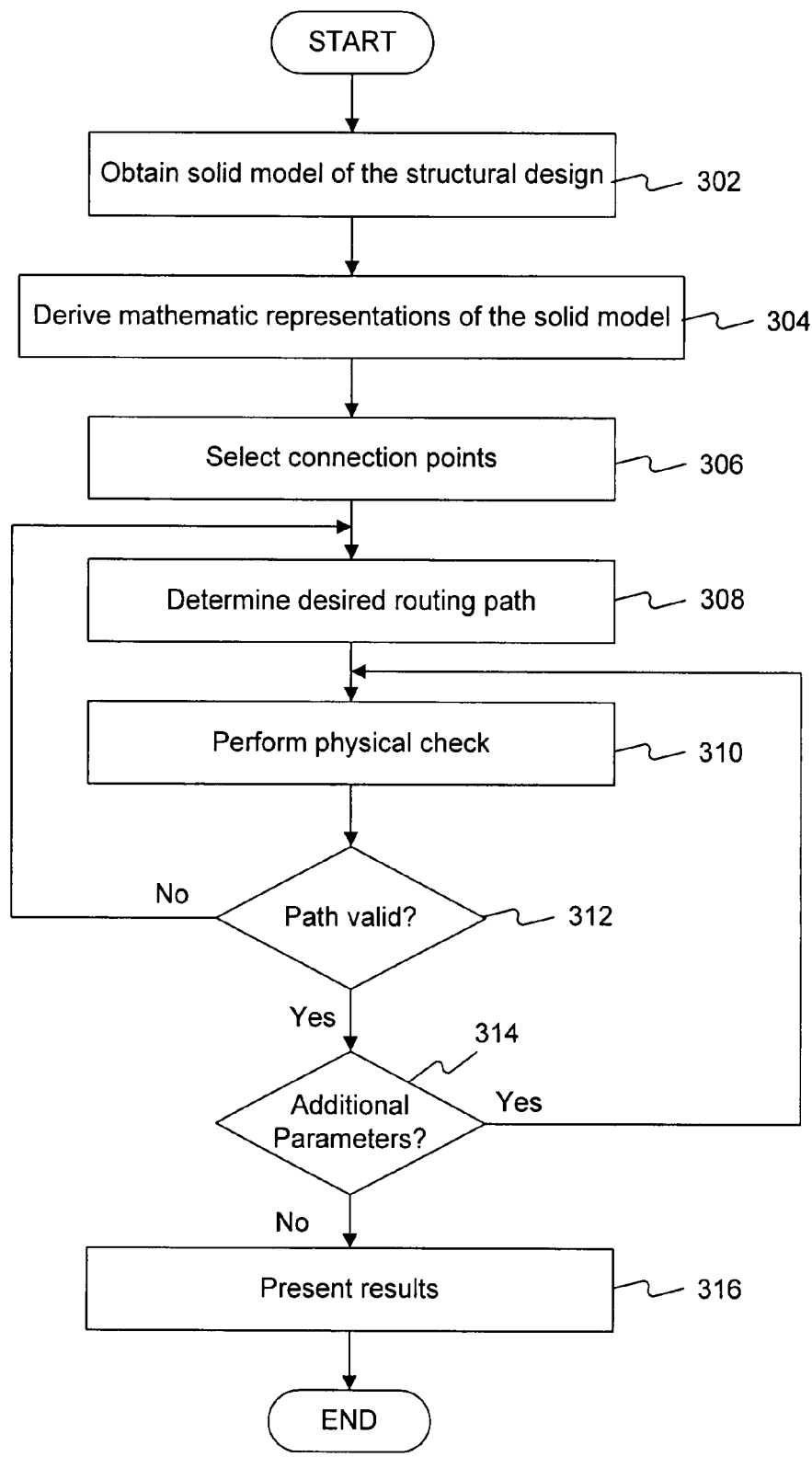
FIG. 3 illustrates a flowchart of an exemplary hose and harness routing process consistent with certain disclosed embodiments.

In certain embodiments, processor 202 may perform routing process 104 to automatically find routing paths for a structural design generated by structural design process 102. FIG. 3 shows a flowchart diagram of an exemplary automatic hose and harness routing process performed by processor 202.

As shown in FIG. 3, at the beginning of the hose and harness routing process, processor 202 may obtain a solid model of a structural design (step 302). A solid model may refer to any structural design model that reflects physical characteristics of structures included in the model and space relationships among the structures. Processor 202 may obtain the solid model from structural design process 102. Processor 202 may also obtain the solid model from any appropriate design applications running on computer system 200 and/or from other computer systems or design applications. After processor 202 obtains the solid model, processor 202 may derive a mathematic representation or representations of the solid model (step 304). Processor 202 may use any appropriate mathematic format to represent the solid model. In certain embodiments, processor 202 may use a stereo lithography (STL) tessellated format to represent the solid model.

The STL format defines surfaces of a solid object as a set of adjacent triangles. The tessellated format defines that each edge is shared only by two triangles. Under the STL tessellated format, the solid object may be represented by X, Y, Z Cartesian coordinates of each vertex of the triangles and coordinates of normal vectors to the triangles, with each edge being shared by two triangles. These 3D coordinates may be included in an ASCII or binary file to be used by various software application programs. The accuracy of the STL tessellated format may depend on the number of triangles representing a solid model. A larger number of triangles may provide a higher accuracy.

Processor 202 may select connection points through which the hoses and harnesses are to be routed (step 306). In certain embodiments, processor 202 may select connection points in pairs. For example, processor 202 may select a pair of connection points to be routed. Hose and harness routing may be realized by selecting a desired path between the pair of connection points. The pair of connection points may include a start point and an end point. The hoses and harnesses may be provided between the start point and the end point based on the STL format representation of the solid model. Further, multiple pairs of connection points may routed in a same way separately.

In certain other embodiments, the connection points may not be in pairs. For example, hoses and harnesses may be so-called "flying splices" such that the connection points include a start point and multiple end points, and vice versa. Processor 202 may treat the flying splices as multiple pairs of connection points or may use a middle connection point or points such that pairs of connection points may be used.

Each connection point (e.g., the start point or the end point) may be represented by corresponding 3D coordinates on X, Y, and Z axes. Further, processor 202 may select the connection points based on the structural model or based on inputs from a user or users of computer system 200. For example, the user may input or select connection point from a GUI on console 208 through input devices 210.

Figure 4:
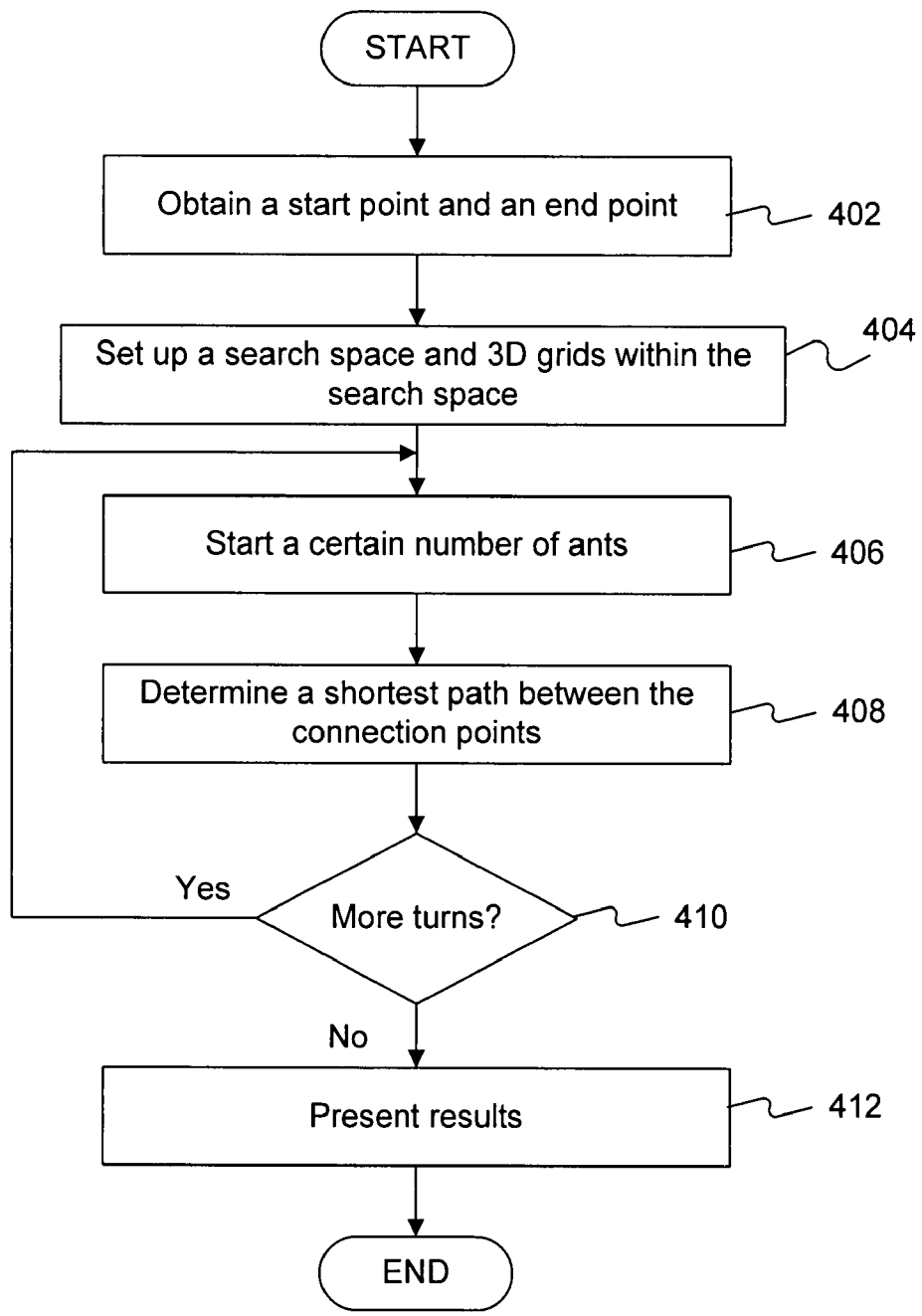
FIG. 4 shows an exemplary path finding process consistent with certain disclosed embodiments.

After processor 202 selects the pair of connection points (step 306), processor 202 may determine a desired routing path between the pair of connection points (step 308). For example, processor 202 may determine a shortest path between the pair of connection points. Other types of desired paths, such as maximum space available, minimum direction changes, and/or most/least surface passage, etc., may also be used. Further, processor 202 may determine the desired routing path based on any appropriate algorithms. In certain embodiments, processor 202 may determine the desired routing path based on an ant colony algorithm. FIG. 4 shows an exemplary path finding process based on the ant colony algorithm.

As used herein, an ant colony algorithm may refer to an algorithm for finding desired or optimal paths based upon the behavior of ants searching for food. The behavior of ants searching for food may be described as follows: at the beginning of a search, the ants may wander randomly. However, when one ant finds a source of food, it walks back to its colony leaving markers (pheromones) to identify the path that leads to the food. When other ants come across the markers, a certain number of them may follow the path if they feel the path is a desired one. When the ants follow the path, they also leave the path with their own markers as they bring the food back.

Because the ants leave pheromones every time they bring food, shorter paths are more likely to have higher level of pheromone or stronger pheromone. Further, some ants may be still randomly scouting for closer food sources. As more ants find the shorter path, the markers of the path become stronger and a majority of ants from the same colony use the shorter path. The shorter path may then be referred to as a desired or optimized path. At the same time, the pheromone may decay over time. If a path marked by pheromone is not traveled by the ants for a certain time, the pheromone level of the path will be weakened or even disappear.

When using the ant colony algorithm to find an optimal path, an ant may refer to a software agent (e.g., a self-contained software program capable of independent execution) that may be executed by processor 202 independently from other ants or software agents. A pheromone may refer to a weight having a value. Each ant may assign the weight when traveling a path. The weight (pheromone) value may be fixed or predetermined by processor 202. The weight value may also be variable over other parameters, such as time. Further, an ant colony may refer to a particular pair of connection points (e.g., a path) or a group of paths that serve certain functionalities, such as electrical wiring, or hydraulic lines, etc.

As shown in FIG. 4, at the beginning of the path finding process, processor 202 may obtain 3D coordinates of a start point S and an end point T (step 402). Processor 202 may also set up a search space and 3D grids within the search space (step 404). The search space may be defined by a minimum coordinate ($X_{min}$, $Y_{min}$, $Z_{min}$) and a max coordinate ($X_{max}$, $Y_{max}$, $Z_{max}$). The entire space between the minimum coordinate and the maximum coordinate (at least including start point S and end point T) may be used as search space for finding a desired path between start point S and end point T.

The 3D grids may refer to a pattern of X-axis (horizontal), Y-axis (vertical), and Z-axis lines forming cubes of a uniform size. The 3D grids may be formed within the entire search space and each cube may be used as a smallest segment of a path. That is, the path between start point S and end point T includes a series of cubes located by their corresponding 3D coordinates (i.e., 3D grid points). Other 3D geometry shapes, however, may also be used. For example, when using finite element analysis (FEA), the 3D grid approach may be referred to as an n-modal decomposition of a three-dimensional space. However, the three-dimensional space may also be described using a p-model decomposition, which may result in units of space that are not cubes. In some situations, such units may not be of regular geometry shapes.

Further, the uniform size of the 3D grids may be referred to as an increment in each axis of X-axis, Y-axis, and Z-axis for defining grid points. A path may be determined by connecting a series of adjacent grid points, and a grid point may also be used as a base point to measure physical dimension of the hose to be routed, such as a radius of the hose. In certain embodiments, the 3D grids may also include randomly generated 3D network of valid paths.

After processor 202 sets up the 3D grids and selects the search space (step 404), processor 202 may start a certain number of ants (i.e., software agents) to search routing paths (step 406). Each ant or software agent may determine a path between the start point S and the end point T by choosing certain grid points between S and T and mark the grid point with pheromone according to a probabilistic state transmission rule. The probabilistic state transmission rule may reflect the preference for an ant to choose a grid point with a high amount of pheromone (or a large weight) along a path. The probabilistic state transmission rule may be described to as:

$$p_k(r, s) = \begin{cases} \dfrac{[\tau(r, s)] \cdot [\eta(r, s)]^\beta}{\sum_{u \in J_k(r)} [\tau(r, s)] \cdot [\eta(r, s)]^\beta}, & \text{if } s \in J_k(r) \\ 0, & \text{if } s \notin J_k(r) \end{cases} \quad (1)$$

to indicated the probability with which ant k moves from point r to point s, where r is the pheromone, $\eta = 1/\delta$ is the inverse of the distance from the point s to a target point

[δ(r,s)], $J_k(r)$ is the set of neighboring points of r that remain to be visited by ant k positioned on the point r, and β is a parameter which determines the relative importance of pheromone versus distance (β>0).

After a certain amount of time, which may be referred to as a turn or an iteration, a certain number of ants may be able to complete traveling between the start point S and the end point T and a certain number of paths may then be created by different ants. A global updating may be performed to determine pheromone levels associated with the different paths. The global rule may be described as:

$$\tau(r, s) \leftarrow (1 - \alpha) \cdot \tau(r, s) + \sum_{k=1}^{m} \Delta\tau_k(r, s) \qquad (2)$$

where $\tau(r, s)$ is the pheromone level, $0<\alpha<1$ is a pheromone decay parameter, $L_k$ is the length of the tour performed by ant k, and m is the number of ants that were able to complete their tour between the start point S and the end point T within the current turn or within certain number of turns, and $$\Delta\tau_k(r, s) = \begin{cases} \frac{1}{L_k}, & \text{if } (r, s) \in \text{ tour done by } ant\ k \\ 0, & f(r, s) \notin \text{ tour done by } ant\ k \end{cases} \qquad (3)$$

In certain embodiments, the total number of ants k may be set to 10, initial pheromone level for each path may be set to 100, the pheromone decay parameter α may be set to 0.01, and β may be set to 5.

Further, in certain embodiments, more than one ant colonies may be used for finding the path. The global rule may then be described as:

$$\tau(r, s) \leftarrow (1 - \rho)\tau(r, s) + \sum_{c=1}^{n} \sum_{k=1}^{m_c} \Delta\tau_{ck}(r, s) \qquad (4)$$

where $\tau(r,s)$ is the pheromone level, and $$\Delta\tau_{ck}(r, s) = \begin{cases} F_{ck}, & \text{if } (r, s) \in \text{ tour done by } ant\ k \text{ of colony } c \\ 0, & \text{otherwise} \end{cases} \qquad (5)$$

$0<\rho<1$ is a pheromone decay parameter, n is number of colonies (or number of commodities), $m_c$ is number of ants in colony c that were able to complete their tours within stipulated turns $N_{turns}$ and $F_{ck}$ is pheromone contribution of edges on path ($P_{ck}$) produced by ant k of the colony c, which may be defined as $$F_{ck} = w_1 * \frac{1}{L_{ck}} + w_2 * \frac{s_{ck}}{L_{ck}} \qquad (6)$$

where $L_{ck}$ is length of path $P_{ck}$ and $s_{ck}$ is total shared length of path $P_{ck}$ with paths produced by ants of other colonies (i.e. other than colony c). Total shared length $s_{ck}$ may be defined as $$s_{ck} = \sum_{\substack{c'=1 \\ c' \neq c}}^{n} \sum_{k'=1}^{m_{c'}} l(P_{ck} \cap P_{c'k'}) \qquad (7)$$

where l is length and $m_{c'}$ is number of ants in colony c' that were able to complete their tours within the stipulated turns $N_{turns}$. $w_1$ and $w_2$ ($w_1+w_2=1$) are two weights that measure importance of the length of path $P_{ck}$ relative to total shared length $s_{ck}$.

The global update may also be performed when any ant completes traveling between the start point S and the end point T. The global update may also be performed periodically with a predetermined time interval. Further, the global update may be performed periodically and when an ant completes its tour between the start point S and the end point T. Once an ant completes its tour, the ant may be removed from the system because the ant no longer needs to travel (e.g., terminating the particular software agent). After each global update, processor 202 may determine a shortest path with highest level of pheromone (step 408).

Further, processor 202 may determine whether a maximum number of turns or iterations have been reached (step 410). Processor 202 may obtain the maximum number of turns from database 214, from other application programs or computer systems, or from a user input. In one embodiment, the maximum number of turns may be set to about 10,000.

If processor 202 determines that the maximum number of turns or iterations have not been reached (step 410; yes), processor 202 may continue the path finding process from step 406. On the other hand, if processor 202 determines that the maximum number of turns have been reached (step 410; no), processor 202 may present the shortest path to other applications programs or computer systems (step 412). Processor 202 may also present the shortest path and/or other associated information to a user through console 208.

Returning to FIG. 3, after determining the desired routing path (step 308), processor 202 may perform a physical check on the determined desired path (step 310). A physical check on the path may refer to a validity check of the path based upon the physical characteristics of the path (e.g., a physical hose or harness, etc.). For example, a hose may have a size requirement, and processor 202 may determine whether the hose of the particular size can fit in the space surrounding the shortest path based upon the solid model of the structural design. Other physical characteristics, such as configurations and contours, however, may also be used.

Further, processor 202 may determine whether the path is valid after the physical check (step 312). For example, processor 202 may determine whether a hose with a particular size fits in the space with or without considering other factors such as installation and/or maintenance. If processor 202 determines that the path is not valid (step 312; no), processor 202 may continue the determining process from step 308 to generate a different path. On the other hand, if processor 202 determines that the path is valid (step 312; yes), processor 202 may further determine whether additional parameters are to be considered (step 314).

Additional parameters may include parameters that are not dimensional parameters of the hose or harness under physical check, but are related to the dimensional parameters in certain ways. For example, an engine radiator pipe or hose may include a flow rate or a fluid pressure that is not a dimensional parameter but may have direct impact on choosing the dimensional parameters. A particular fluid pressure requirement may change the size of the pipe. For another example, a voltage loss requirement on an electrical wire may also cause dimensional parameter change in an electrical harness.

If processor 202 determines that additional parameters need to be considered (step 314; yes), processor 202 may determine an actual limitation on the physical or dimensional parameters and may further perform physical check again from step 310.

On the other hand, if processor 202 determines that no additional parameters need to be considered (step 314; no), processor 202 may present the results of the hose and harness routing process (step 316). If multiple pairs of connection points are selected, processor 202 may process each pair of the connection points as described above and may also present the results of multiple pairs of connection points. Processor 202 may present the results (e.g., locations, parameters of the hose or harness, etc.) to other applications programs or computer systems. Processor 202 may also present the results to a user through console 208 and/or other interfaces, such as a GUI. Further, a common pheromone distribution may also be presented.

In certain practical applications, there may be several or many hoses or harnesses to be routed within the structural design. Routing of multiple hoses and harness is performed simultaneously using a multi-colony algorithm. Multiple paths between the same start point and end point as well as different paths between different connection points may need to be determined. In certain situations, hoses or paths may interfere or collide with each other because only one hose can occupy one space at any given time.

In other situations, the desired routing path may include certain turns in various degrees, or the routing path of a particular hose may need to be bend or turned to avoid interference or collision with the routing path of another hose. However, certain hoses, with physical characteristics, may be unable to bend or change directions according to the degree of a particular turn. Hose or pipe fittings may be used to change directions of the routing paths of hoses. Fittings may also be used to avoid a collision by changing the direction of a colliding path between two or more interfering paths. In addition, the space for such fittings may also need to be considered when determining whether a particular path is valid.

Figure 5:
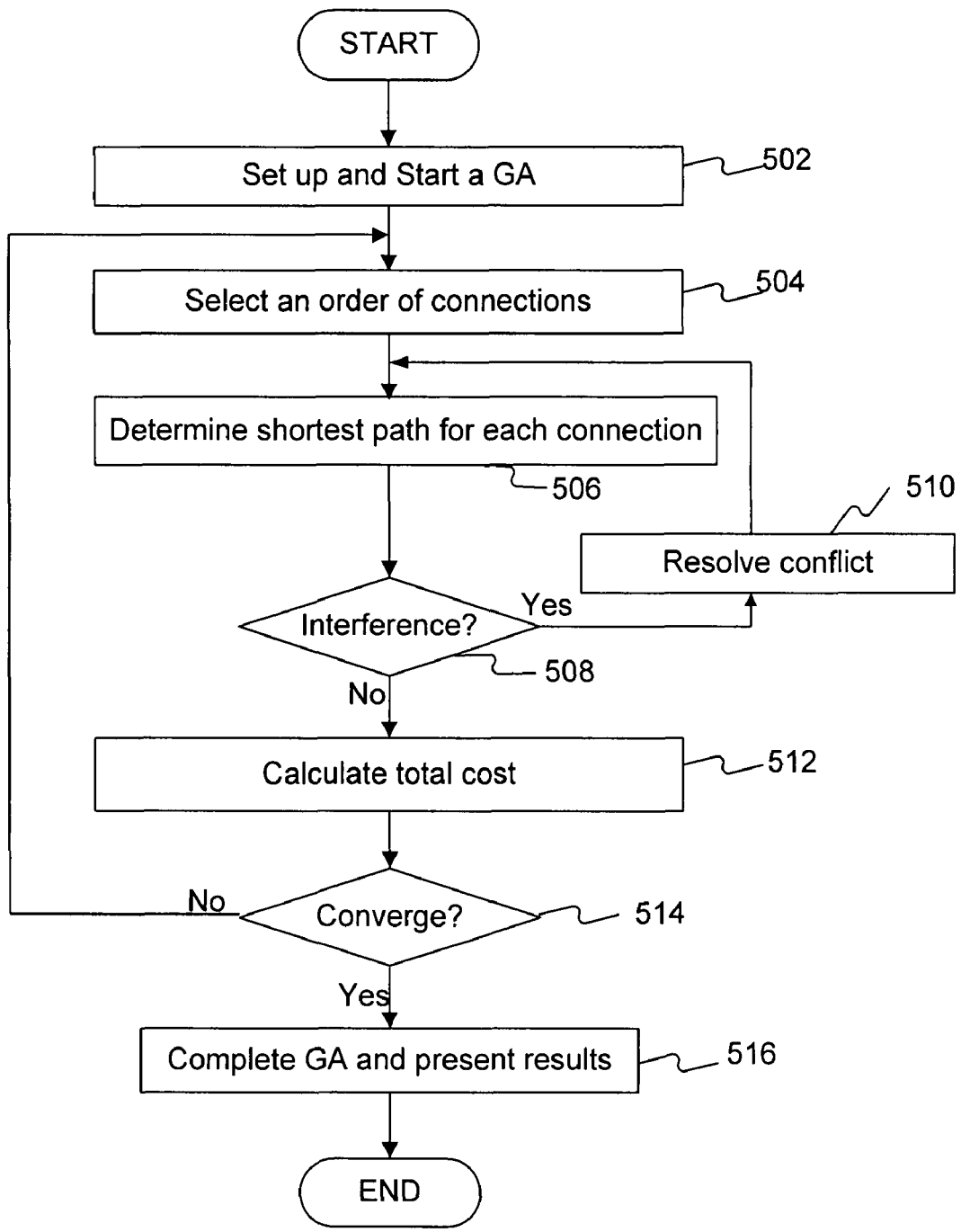
FIG. 5 shows a block diagram of an exemplary multi-path routing process consistent with certain disclosed embodiments.

To solve this multiple hosing problem, processor 202 may perform a multi-path determining process to choose desired multiple paths. FIG. 5 shows an exemplary multi-path routing process consistent with the disclosed embodiments.

Processor 202 may determine desired multiple paths based on a total cost of the paths. As used herein, the cost of a path may refer to any appropriate and tangible measuring of either functional or physical characteristics of the path. For example, the cost may include total length of multiple paths, length of shared paths, hose and harnesses cost, manufacturing cost, installation cost, maintenance cost, the amount of restraint on a particular functionality, the length of the path. The cost may also include physical weight of the hoses and harnesses, accessibility of the hoses and harnesses, and/or serviceability of the hoses and harnesses. Further, the cost may include any appropriate combinations of the above factors. In certain embodiments, processor 202 may select the desired multiple paths when the total cost of the paths is a minimum or is below a predetermined threshold. Various algorithms may be used by processor 202.

As shown in FIG. 5, processor 202 may determine the multiple paths based on a genetic algorithm and/or a multi-colony ant algorithm. At the beginning of the process, processor 202 may set up and start a genetic algorithm (GA) (step 502). The genetic algorithm may include any appropriate type of genetic algorithm that may be used to find possible optimized solutions based on the principles of adopting evolutionary biology to computer science.

When applying a genetic algorithm to search a desired combination of multiple routing paths, a particular order of the multiple paths may be associated with a variable and the multiple paths may be represented by a list of parameters used to drive an evaluation procedure of the genetic algorithm. The parameter list may be called a chromosome or a genome, which may represent an encoding of all variables, either selected or unselected. For example, a "0" encoding of a variable may indicate that the variable is not selected, while a "1" encoding of a variable may indicate that the variable is selected. Chromosomes may also include genes, each being an encoding of an individual variable. Chromosomes or genomes may be implemented as strings of data and/or instructions.

Initially, several such parameter lists or chromosomes may be generated to create a population. A population may be a collection of a certain number of chromosomes. The chromosomes in the population may be evaluated based on a fitness function or a goal function, and a value of goodness or fitness may be returned by the fitness function or the goal function. The population may then be sorted, with those having better fitness ranked at the top. Processor 202 may set the fitness function or the goal function based on the total cost of the multiple paths.

The genetic algorithm may generate a second population from the sorted initial population by using any or all of the genetic operators, such as selection, crossover (or reproduction), and mutation. During selection, chromosomes in the population with fitness values below a predetermined threshold may be deleted. Selection methods, such as roulette wheel selection and/or tournament selection, may also be used. After selection, reproduction operation may be performed upon the selected chromosomes. Two selected chromosomes may be crossed over along a randomly selected crossover point. Two new child chromosomes may then be created and added to the population. The reproduction operation may be continued until the population size is restored. Once the population size is restored, mutation may be selectively performed on the population. Mutation may be performed on a randomly selected chromosome by, for example, randomly altering bits in the chromosome data structure.

Selection, reproduction, and mutation may result in a second generation population having chromosomes that are different from the initial generation. The average degree of fitness may be increased by this procedure for the second generation, since better fitted chromosomes from the first generation may be selected. This entire process may be repeated for any appropriate numbers of generations until the genetic algorithm converges. Processor 202 may determine a convergence based on the fitness function or goal function.

After processor 202 sets up and starts the GA (step 502), processor 202 may select an order or priority among pairs of connection points or paths (step 504). Initially, processor 202 may generate a random order to start. And the order may be later selected based on GA operations, such as selection, crossover, or mutation, etc., as explained above. The order or priority may be referred to as a sequence in which an individual path (i.e., the ants of the individual path) starts. Further, processor 202 may determine shortest path for each path or connection (step 506). Processor 202 may use the process or processes described in FIG. 3 and/or FIG. 4 (the ant colony algorithm, etc.) to determine the shortest path for each pair of connection points. Other methods, however, may also be used.

After respective shortest paths are determined, processor 202 may further determine whether there are conflicts among multiple paths (step 508). For example, different paths may collide with each other, certain paths may be unable to bend in arbitrary directions, or certain paths may need to be separated in a certain way, etc. If there is any conflict (step 508; yes), processor 202 may resolve the conflict (step 510).

Processor 202 may resolve the conflict automatically based on predetermined algorithms or based on certain configurations. Processor 202 may also resolve the conflict based on user inputs. For example, processor 202 may present the conflict to a user or users of computer system 200, and the user may input rules and/or ways to resolve the conflict. In one embodiment, the user may combine more than one path together or keep several paths running parallel as much as possible. The user or processor 202 may also use pipe or hose fittings to change the direction of a particular path of a hose to cross a collision point between the particular path and a path of another hose. That is, processor 202 may use fittings to maneuver one hose around the other path such that the one path may pass the collision point without colliding with the other path. For example, a small size hose may be bent or configured with fittings to cross over a large size hose at the collision point. In certain embodiments, priority of a hose (e.g., based on the order of the paths, etc.) may also be used to determine a dominant path over which other paths need to traverse (e.g., to cross over, etc.). Other techniques, however, may also be used. Once selected, the conflict resolving mechanism may remain until further changed by processor 202.

After resolving the conflict (step 510), processor 202 may continue the process from step 506 to re-determine shortest paths with the constraints. On the other hand, if processor 202 determines that there is no conflict between the multiple paths (step 508; no), processor 202 may calculate a total cost of the multiple paths (step 512). For example, as explained above, processor 202 may calculate a total manufacturing cost of the multiple paths. Other costs, however, may also be used.

Further, processor 202 may determine whether the GA converges (step 514). Processor 202 may determine the convergence based on the fitness function of the GA. In certain embodiments, the fitness function of the GA may indicate whether the total cost of the multiple paths is a desired value, such as a minimum total cost or a total cost below a predetermined threshold.

If processor 202 determines that the GA has not converged (step 514; no), processor 202 may continue the GA operations and the multi-path routing process from step 504. On the other hand, if processor 202 determines that the GA has converged (step 514; yes), processor 202 may complete the GA and present the results to other application programs or the user and complete the multi-path routing process (step 516).

In other embodiments, the order or priority among the multiple paths may be equal. The actual sequence may be randomly determined based on the operations of the GA and/or the algorithm for determining the shortest paths, such as the ant colony algorithm.

INDUSTRIAL APPLICABILITY

The disclosed systems and methods may provide efficient and low cost solutions for hose and harness routing, which currently is performed by humans with support from expert systems such as structured design processes (SDPs) for electric lines or fluid lines. The fluid lines may include both flexible lines such as hoses and inflexible lines such as pipes. The disclosed systems and methods provide real-time re-routing after any late modifications made to structural components thus reducing or eliminating the manual or semi-manual process of finding spaces to fit the hoses and harnesses between the modified structural components.

The disclosed systems and methods may be used in many industrial fields such as manufacturing, construction, designing, etc. For example, a vehicle manufacturer may use the disclosed systems and methods to route electrical wirings and various pipes within the vehicle; a construction company may use the disclosed systems and methods to dispose pipes and wirings; a VLSI manufacturer may use the disclosed systems and methods to plan circuit layout; an aircraft manufacturer may use the disclosed systems for routing hoses and harnesses through wing sections; a shipbuilder may use the disclosed systems to route piping, hoses, and wiring through bulkheads, etc.

Further, the disclosed systems and methods may be used together with other computer aided design (CAD) or computer aided manufacturing (CAM) tools to provide automatic path re-routing after any modification made to the product design. The disclosed systems and methods may be provided in different ways. For example, the disclosed systems and methods may be implemented as a computer system pre-loaded with software applications or may be provided as computer-readable media, etc.

Other embodiments, features, aspects, and principles of the disclosed exemplary systems will be apparent to those skilled in the art and may be implemented in various environments and systems.

What is claimed is:

1. A method for automatic hose and harness routing, comprising:

obtaining a solid model of a structural design of a structure assembly;

deriving a mathematical representation of the solid model;

selecting at least a pair of connection points including a start point and an end point;

determining a desired path between the start point and the end point;

performing a validity check on the desired path to decide whether the desired path is valid;

adding flow constraints to the desired path;

repeating the validity check on the desired path with the flow constraints; and presenting the desired path.

2. The method according to claim 1, further including:

determining, if the desired path is not valid, a second desired path between the start point and the end point.

3. The method according to claim 1, wherein the determining includes:

setting up a search space enclosing the start point and the end point;

forming 3D grids within the search space;

starting a predetermined number of ants to travel through the 3D grids based on a first rule such that a plurality of paths between the start point and the end point are created, each path is determined by a plurality of 3D grid points connecting the start point and the end point are marked with pheromones by one or more ants from the predetermined number of ants;

updating respective pheromone levels of the plurality of paths based on a second rule; and determining the desired path as one with a highest level of pheromone among the plurality of paths.

4. The method according to claim 3, wherein, provided that k is an integer, τ is the pheromone, r and s are two points represented by 3D coordinates, η=1/δ is the inverse of the distance from the point s to a target point [δ(r,s)], $J_k(r)$ is the set of neighboring points of r that remain to be visited by ant k positioned on the point r, and β is a parameter which determines the relative importance of pheromone versus distance (β>0), the first rule is represented by:

$$p_k(r,s) = \begin{cases} \frac{[\tau(r,s)] \cdot [\eta(r,s)]^\beta}{\sum_{u \in J_k(r)} [\tau(r,s)] \cdot [\eta(r,s)]^\beta}, & \text{if } s \in J_k(r) \\ 0, & \text{if } s \notin J_k(r). \end{cases}$$

5. The method according to claim 4, wherein pheromone level τ(r,s) is based on at least a pheromone decay parameter and pheromone contributions from ants being able to complete their tour between the start point and the end point.

6. The method according to claim 1, wherein the performing the validity check includes:
assigning dimensional parameters to the desired path; and
determining whether the desired path with the dimensional parameters fits in space surrounding the desired path based on the solid model.

7. The method according to claim 1, wherein adding flow constraints to the desired path includes adding at least one of a fluid flow rate, a fluid pressure, and a voltage loss to the desired path.

8. A method for automatic hose and harness routing, comprising:
selecting a plurality of pairs of connection points;
starting a genetic algorithm with a priority among the plurality of pairs of connection points;
determining a respective plurality of desired paths for the plurality of pairs of connection points in sequence according to the priority;
calculating a total cost of the plurality of desired paths;
determining whether the total cost is below a predetermined threshold; and
completing the genetic algorithm if the total cost is below the predetermined threshold.

9. The method according to claim 8, wherein determining the respective plurality of desired path for the plurality of pairs of connection points is based on an ant colony algorithm.

10. The method according to claim 9, further including:
determining a conflict among the plurality of desired paths; and
resolving the conflict based on the priority using a predetermined mechanism.

11. The method according to claim 10, wherein the resolving further includes:
determining a high priority path and a low priority path; and
using fittings for the low priority path to cross over the high priority path without collision.

12. The method according to claim 9, further including:
changing the priority if the total cost is not below the predetermined threshold; and
continuing the genetic algorithm until the total cost is below the predetermined threshold.

13. The method according to claim 9, wherein the cost is the accessibility and serviceability of the plurality of desired paths.

14. A computer system, comprising:
a processor configured to:
obtain a solid model of a structural design of a structure assembly;
derive a mathematical representation of the solid model;
select at least a pair of connection points including a start point and an end point;
determine a desired path between the start point and the end point including:
setting up a search space enclosing the start point and the end point,
forming 3D grids within the search space, and
starting a predetermined number of ants to travel through the 3D grids based on a first rule; and
perform a validity check on the desired path to decide whether the desired path is valid; and
a database for storing the desired path by the processor.

15. The computer system according to claim 14, wherein, to perform the validity check, the processor is further configured to:
assign dimensional parameters to the desired path; and
determine whether the desired path with the dimensional parameters fits in space surrounding the desired path based on the solid model.

16. The computer system according to claim 14, wherein the processor is further configured to:
determine, if the desired path is not valid, a second desired path between the start point and the end point;
add additional constraints to the validity check of the desired path; and
repeat the validity check on the desired path.

17. The computer system according to claim 14, wherein, to determine the desired path, the processor is further configured to:
create a plurality of paths between the start point and the end point with the predetermined number of ants, each path being determined by a plurality of 3D grid points connecting the start point and the end point and being marked with pheromones by one or more ants from the predetermined number of ants;
update respective pheromone levels of the plurality of paths based on a second rule; and
determine the desired path as one with a highest level of pheromone among the plurality of paths.

18. The computer system according to claim 17, wherein the first rule is represented by $$p_k(r,s) = \begin{cases} \frac{[\tau(r,s)] \cdot [\eta(r,s)]^\beta}{\sum_{u \in J_k(r)} [\tau(r,s)] \cdot [\eta(r,s)]^\beta}, & \text{if } s \in J_k(r) \\ 0, & \text{if } s \notin J_k(r) \end{cases}$$

with k being an integer, τ being the pheromone, r and s being two points represented by 3D coordinates, η=1/δ being an inverse of a distance from the point s to a target point [δ(r,s)], $J_k(r)$ being a set of neighboring points of r that remain to be visited by ant k positioned on the point r , and β being a parameter which determines a relative importance of pheromone versus distance (β>0).

19. A computer-readable medium for use on a computer system configured to perform automatic hose and harness routing, the computer-readable medium having computer-executable instructions for performing a method comprising:

obtaining a solid model of a structural design of a structure assembly;

deriving a mathematical representation of the solid model;

selecting at least a pair of connection points including a start point and an end point;

determining a desired path between the start point and the end point by:

creating a plurality of paths between the start point and the end point based on a first rule with a predetermined number of ants, marking the plurality of paths with pheromones from the predetermined number of ants, and updating pheromone levels of the plurality of paths based on a second rule;

performing a validity check on the desired path to decide whether the desired path is valid; and presenting the desired path.

20. The computer-readable medium according to claim 19, wherein the method further includes:

determining, if the desired path is not valid, a second desired path between the start point and the end point.

21. The computer-readable medium according to claim 19, wherein the determining further includes:

setting up a search space enclosing the start point and the end point;

forming 3D grids within the search space;

starting a predetermined number of ants to travel through the 3D grids based on the first rule to create the plurality of paths, each path being determined by a plurality of 3D grid points connecting the start point and the end point and being marked with pheromones by one or more ants from the predetermined number of ants; and determining the desired path as one with a highest level of pheromone among the plurality of paths.

22. The computer-readable medium according to claim 19, wherein the first rule is represented by $$p_k(r,s) = \begin{cases} \dfrac{[\tau(r,s)] \cdot [\eta(r,s)]^\beta}{\sum\limits_{u \in J_k(r)} [\tau(r,s)] \cdot [\eta(r,s)]^\beta}, & \text{if } s \in J_k(r) \\ 0, & \text{if } s \notin J_k(r) \end{cases}$$

with k being an integer, $\tau$ being the pheromone, r and s being two points represented by 3D coordinates, $\eta=1/\delta$ being an inverse of a distance from the point s to a target point [$\delta(r,s)$], $J_k(r)$ being a set of neighboring points of r that remain to be visited by ant k positioned on the point r, and $\beta$ being a parameter which determines a relative importance of pheromone versus distance ($\beta>0$).

* * * * *